United States Patent [19]  [11] 4,135,684
Willey  [45] Jan. 23, 1979

[54] SINGLE TUBE PNEUMATIC BANKING SYSTEM
[75] Inventor: Clair L. Willey, Marion, Iowa
[73] Assignee: Walter Kidde & Company, Inc., Clifton, N.J.
[21] Appl. No.: 825,283
[22] Filed: Aug. 17, 1977
[51] Int. Cl.² ............................................. B65G 51/32
[52] U.S. Cl. ................................................... 243/19
[58] Field of Search ........................ 243/1, 7, 8, 9, 19, 243/20, 23, 24, 25, 28, 36, 38

[56] References Cited
U.S. PATENT DOCUMENTS

| | | | |
|---|---|---|---|
| 3,711,038 | 1/1973 | Van Otteren | 243/19 X |
| 3,738,592 | 6/1973 | Smith et al. | 243/19 |
| 4,004,753 | 1/1977 | Thomas et al. | 243/19 |

Primary Examiner—Robert W. Saifer
Assistant Examiner—James L. Rowland
Attorney, Agent, or Firm—Haven E. Simmons; James C. Nemmers

[57] ABSTRACT

The customer station or terminal of a pneumatic carrier system for drive-up banking and the like employing a single interconnecting tube features a horizontally disposed, tubular carrier receiver connected at one end to the tube and slotted adjacent its other end for insertion and removal of a carrier. The slotted aperture is opened and closed by a sliding sleeve controlled by the arrival of a carrier at and its subsequent replacement in the receiver by a customer.

13 Claims, 7 Drawing Figures

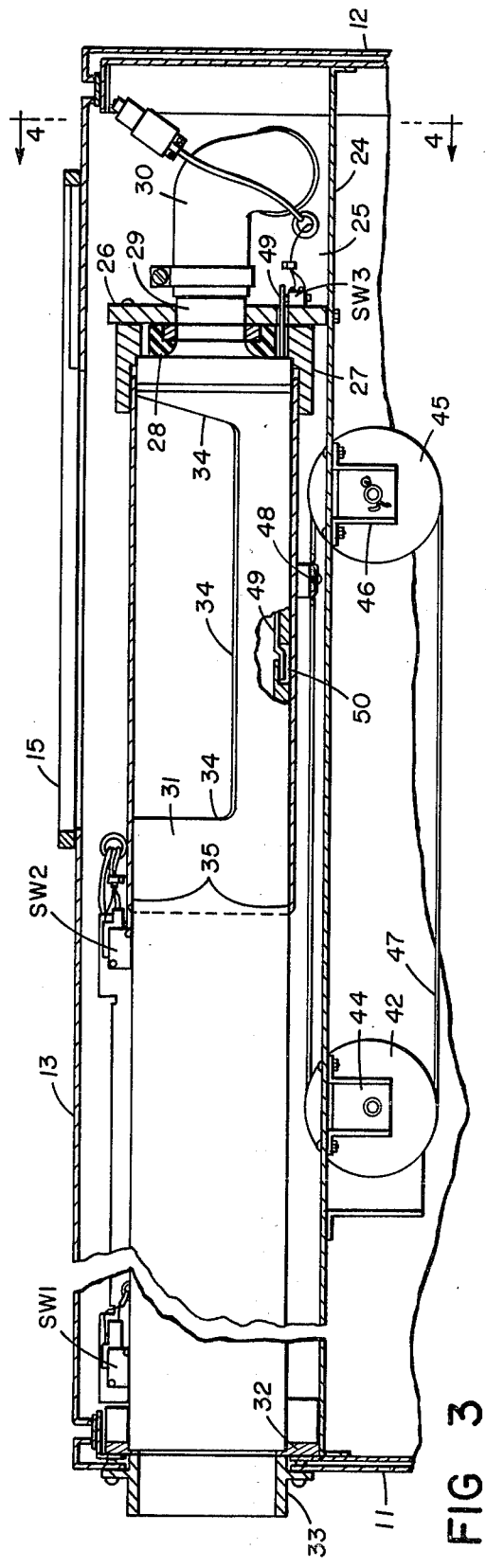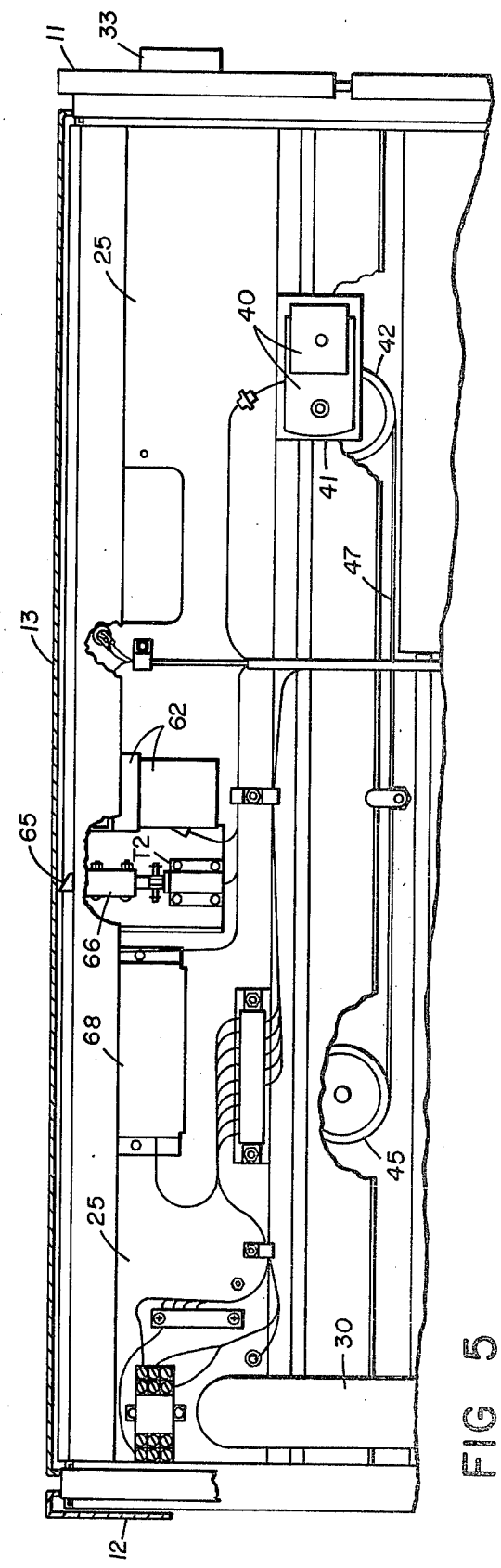

SINGLE TUBE PNEUMATIC BANKING SYSTEM

BACKGROUND OF THE INVENTION

The invention involves pneumatic tube apparatus used for drive-up and like banking in which a number of exterior customer terminals or stations, located on a driveway, for instance, are connected by pneumatic tubes to an interior teller terminal or station at the bank. Banking transactions are carried on by carriers which are pneumatically transported back and forth through the tubes between the customer and the teller stations. Sometimes a pair of tubes are utilized between each customer and teller station. Or, as in the present instance, a single tube is employed so that the carrier is either drawn or pushed through the tube depending upon in which direction it is traveling. The necessary air is supplied by a blower operating through a shift valve that determines the direction of air travel through the tube.

SUMMARY OF THE INVENTION

The main point of the present invention is to provide a simplified form of customer's station requiring a minimum amount of apparatus for handling the arrival of a carrier, making it available to the customer, and arranging for its ultimate dispatch by the customer to the teller station. To this end, the carrier arrives from the interconnecting tube directly into one end of an elongated tubular receiver horizontally mounted and slotted adjacent its remote end so that the carrier can be removed and replaced. The latter end of the receiver forms a carrier stop and also opens into a duct leading to the shift valve and the blower so that air is either exhausted from or supplied to the receiver in order respectively to receive or send a carrier. The slotted opening in the receiver in turn is closed by an enveloping sleeve slidable on the receiver. The receiver, blower, etc., are enclosed in an outer housing having a sliding door for weather and like protection. An appropriate electrical control system opens and closes the receiver sleeve and housing door, turns the blower on and off and operates the shift valve at the customer station, as well as performing similar functions at the teller station, all governed by passage of the carrier in one direction or the other and various manipulations of the carrier by the customer and the teller.

BRIEF DESCRIPTION OF THE DRAWINGS

FIG. 3 is an elevational view of the upper portion of the customer station, similar to FIG. 2, but with certain additional components removed and others shown in section.

FIG. 5 is an elevational view of the upper portion of the rear of the customer station with the housing back panel removed.

DETAILED DESCRIPTION OF THE PREFERRED EMBODIMENT

Figure 1:
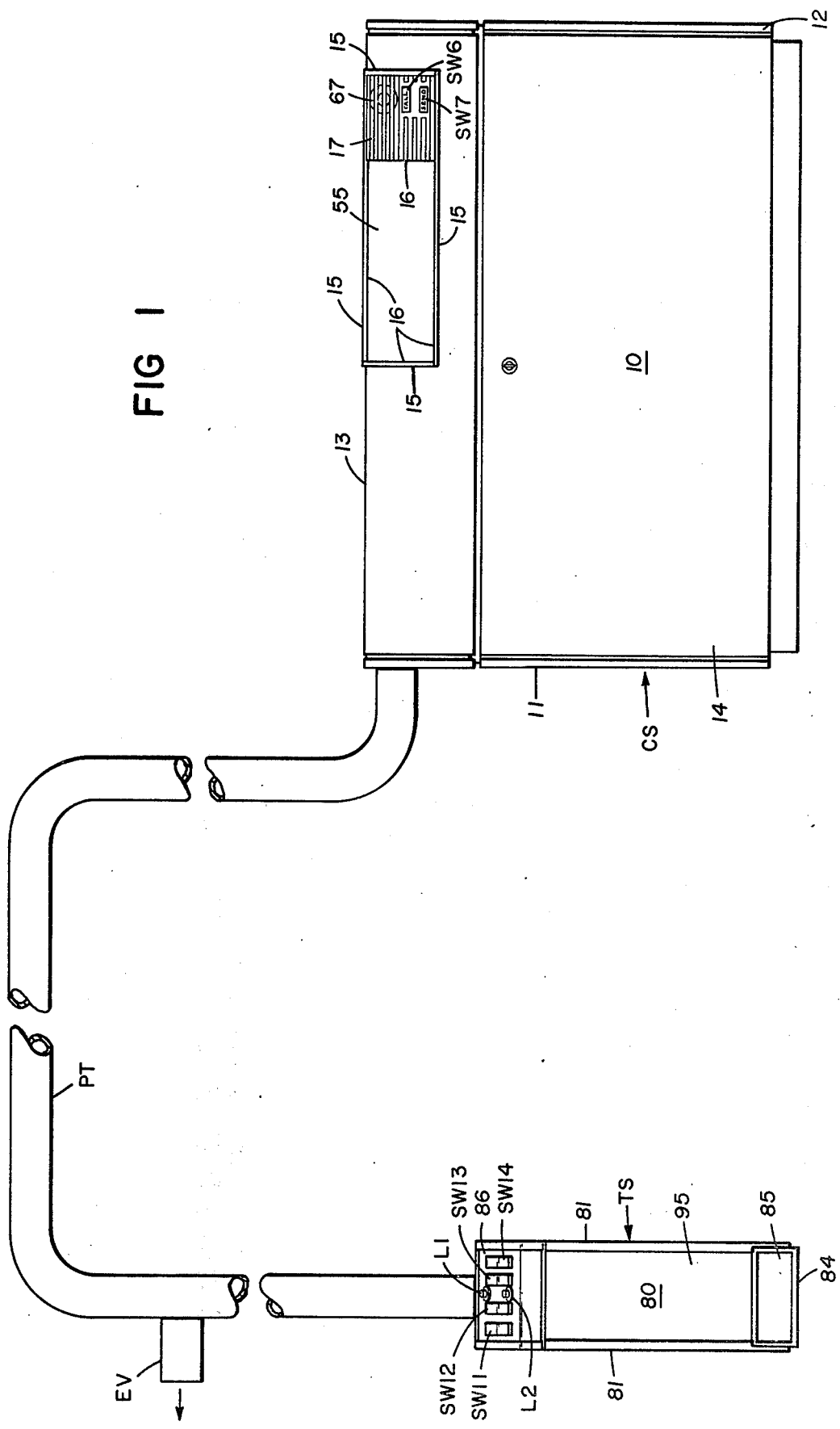
FIG. 1 is a front elevational view of the overall system of the present invention showing the interconnected customer and teller stations.

As shown in FIG. 1, the system of the present invention is incorporated into an "overhead" version in which the single tube is elevated above the ground instead of being interred in it, though the latter version is of course perfectly feasible. In any event, the customer station, designated generally as CS, is connected by an appropriate pneumatic tube PT and exhaust only valve EV to the teller station, generally designated as TS. It will be understood, of course, that for each customer station CS there is a tube PT and teller station TS. The customer station CS features a rather wide, fairly low decorative housing 10 having side walls 11 and 12, and a removable cover 13 closing the top and upper portion of the front of the housing 10, the remainder of the front being closed by an additional removable panel 14. Depending upon whether the tube PT enters the side wall 11 or 12, that is, whether the station CS is a "left" or "right" hand version, the portion of the cover 13 remote from the tube entrance is rectangularly apertured at its top and front, as defined by framing 15, to provide a carrier access opening 16 and a location for a customer panel 17 to one side of the opening 16.

Figure 2:
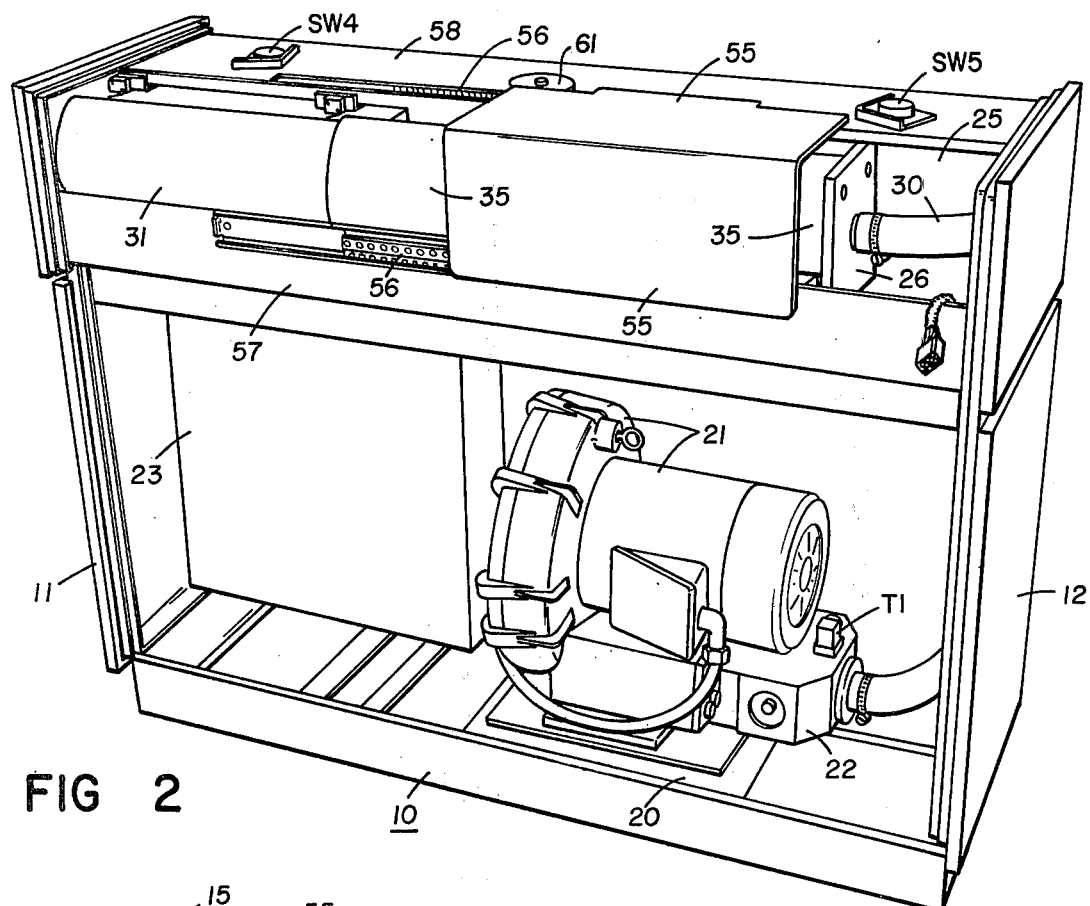
FIG. 2 is a front isometric view of the customer station shown with the housing front and top panels removed.
Figure 4:
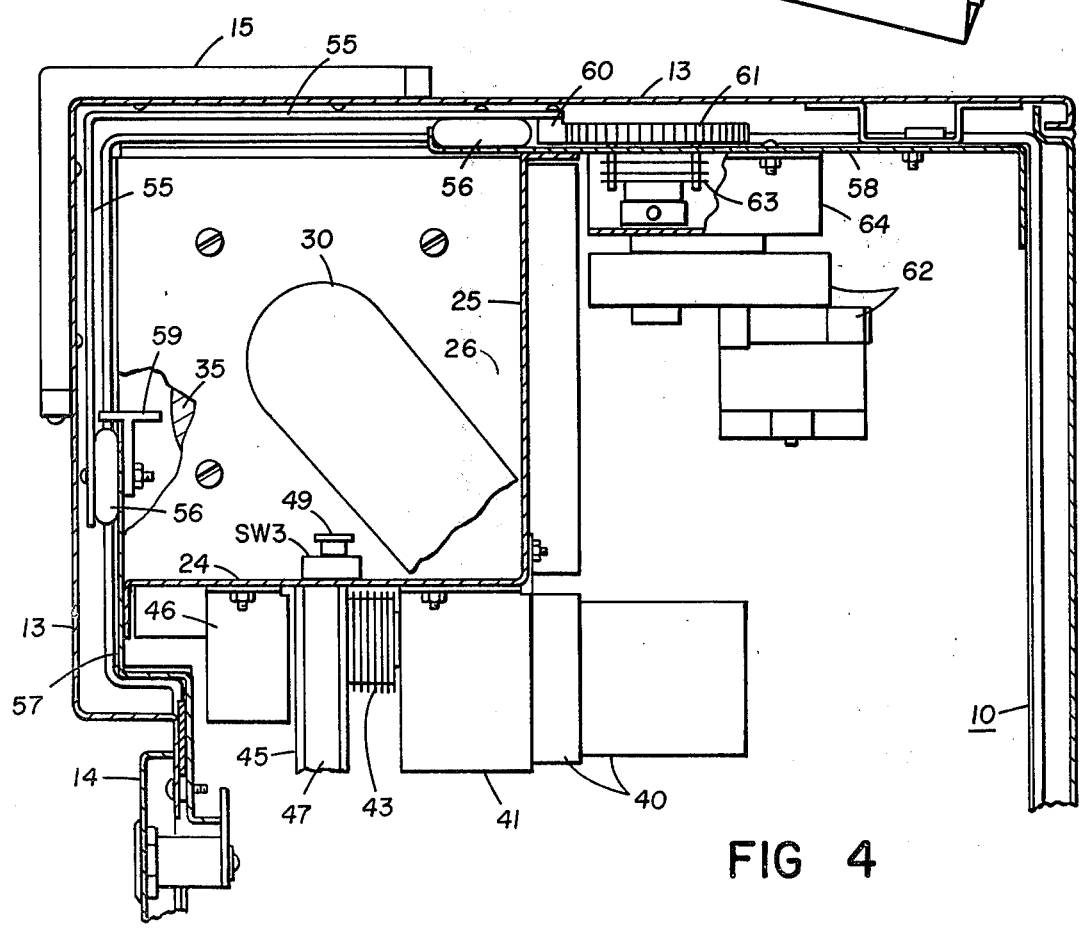
FIG. 4 is a sectional view taken along the line 4—4 of FIG. 3.

An inner floor 20 of the housing 10 mounts the blower and motor 21 and the solenoid operated shift valve 22, circuit connected at T1, together with a cabinet 23 for various electrical conponents (see FIG. 2). A forward shelf 24 and inner backwall 25 within the housing 10 above the level of the panel 14 support an upright receiver end block 26 inboard from and parallel to the sidewall 12 (see FIGS. 3 and 4). To the inboard face of the block 26 is screwed one end of an annular fitting 27 in which is seated an annular carrier stop cushion 28 of elastomeric material. The belled end of a hose coupling 29 opens out into the fitting 27 through the cushion 28 and block 26, its other end being connected to a hose 30 passing through the rear wall 25 and attached in turn to one port of the shift valve 22. Into the other end of the fitting 27 is spigotted the remote end of a horizontal tubular carrier receiver 31, of Teflon-impregnated anodized aluminum, whose other end is seated in a fitting 32 bolted together with an adapter 33 to and through the opposite end wall 11. The pneumatic tube PT is connected in turn to the adapter 33. Adjacent the fitting 27 the upper half or so of the receiver 31 is apertured or slotted to provide an elongated carrier receptacle 34. The latter is opened and closed by an eveloping annodized aluminum sleeve 35, also Teflon-impregnated, slidable on the receiver 31 and which when closed seats within a counterbore in the fitting 27.

The sleeve 35 is operated by an appropriate reversible electric motor and gearbox 40 (see FIGS. 4 and 5) supported from a bracket 41 below the shelf 24 which drive a pulley 42 through a slip clutch 43, the pulley 42 being appropriately journaled on brackets 44 (see FIG. 3) from the shelf 24 directly beneath the sleeve 35. A laterally opposite pulley 45 is similarly journaled on brackets 46 and a belt 47 passes over both, being attached at 48 to the sleeve 35. For the latter purpose the shelf 24 is apertured to allow the pulleys 42 and 45 and the upper flight of the belt 47 to pass thereabove. Sleeve open and close limit switches SW1 and SW2 (see FIG. 3) are disposed above the sleeve 35 on suitable brackets, while a carrier arrive-send plunger switch SW3 of the momentary contact type is disposed at the lower outboard face of the end block 26 with its plunger upright. Upon the latter rests the outer end of a switch operating lever 49 extending through the fitting 27 and along the floor of the receiver 31 below the carrier receptacle 34, its inner end being offset and loosely captured in a slot 50 in the floor of the receiver.

The carrier access opening 16 in the housing 10 is provided with a horizontally sliding closure or door 55 bent from suitable sheet metal. The door 55 is carried by a pair of linear ball slides 56 mounted to the bottom and rear edges of the door 55 and to front and top inner brace panels 57 and 58 extending between the side panels 11 and 12. A T-shaped protective member 59 overlies the lower slide 56 and the space between the carrier access opening 16 and the sleeve 35. The door 55 is propelled between open and closed positions by a rack 60 attached along the rear edge of the door 55 and a pinion 61 driven by a reversible motor and gearbox 62 through a slip clutch 63, the motor and gearbox 62 being mounted to a bracket 64 depending from the panel 58 (see FIGS. 2, 4 and 5). Provision for locking the door 55 closed is made by a vertical latch 65, engageable with an aperture in the door 55, slidable in a bracket 66 attached to the inner back wall 25 and driven by a solenoid T2 similarly mounted. A pair of open and closed door limit switches SW4 and SW5 are fixed on the panel 58 in the route of the door 55, and upon the customer panel 17 is mounted a microphone 67, a teller call switch SW6 and a carrier send switch SW7, a speaker 68 being mounted on the backwall 25 behind the receiver 31 (see FIGS. 1 and 5).

The corresponding teller station TS, on the other hand, comprises a much smaller, upright rectangular housing 80 including sidewalls 81, a rear wall 82, top wall 83, bottom wall 84, a lower fixed front wall 85, and an upper control panel 86. Forwardly mounted within the housing 80 is an upright aluminum casting or receiver 90 fixed to and between a pair of upright plates 91 attached to the housing 80. The receiver 90 has a cylindrical bore to receive a carrier through its upper end into which is seated an inner adapter 92 extending through the top wall 83 and an outer adapter 92b for connection to the tube PT. The front of the receiver 90 between the wall 85 and panel 86 is open to provide a carrier receptacle 93 whose mouth 93a is reversely inclined and generally rectangular in shape, being fitted with sealing material 94. Against the latter bear the edges of a complementary shaped door 95, hinged at 96 at its lower end to the receiver 90, which opens outwardly as indicated for access to the latter. The bottom of the door 95 is fitted with a U-shaped carrier stop cushion 97 up through which extends the plunger of a switch SW8 of the momentary contact type. To a boss 98 on the rear of the receiver 90 partially below the cushion 97 is fitted an intake only valve IV which communicates through an adapter 99 in the bottom wall 84 with the exterior of the housing 80.

The door 95 is opened and closed by a pair of link arms 100 hinged at 101 at their outer ends to the sides of the door 95, their inner ends being hinged at 102 to the outer ends of a pair of pitman arms 103. The other ends of the latter are fixed to the ends of a transverse shaft 104 journaled between a pair of spaced upright mounting plates 105 extending rearwardly from and attached to the receiver 90 between the plates 91. Fixed to the midpoint of the shaft 104 is a bushing 106 connected through a slip clutch 107 to a pulley 108 rotable on the shaft 104. A drive belt 109 extends from the pulley 108 up over a drive pulley 110 driven by a reversible motor and gearbox 111 mounted by brackets 112 to the plates 105. A pair of door open and closed limit switches SW9 and SW10 are mounted to one of the plates 105 and operated by a cam 113 fixed to the shaft 104 opposite the bushing 106. On the control panel 86 are mounted a carrier send-recall switch SW11, a receptacle open-close switch SW12, a teller door open-close switch SW13 and a power off-on switch SW14, plus carrier-present and door-receptacle open indicator lamps L1 and L2 for the customer station CS.

Figure 6:
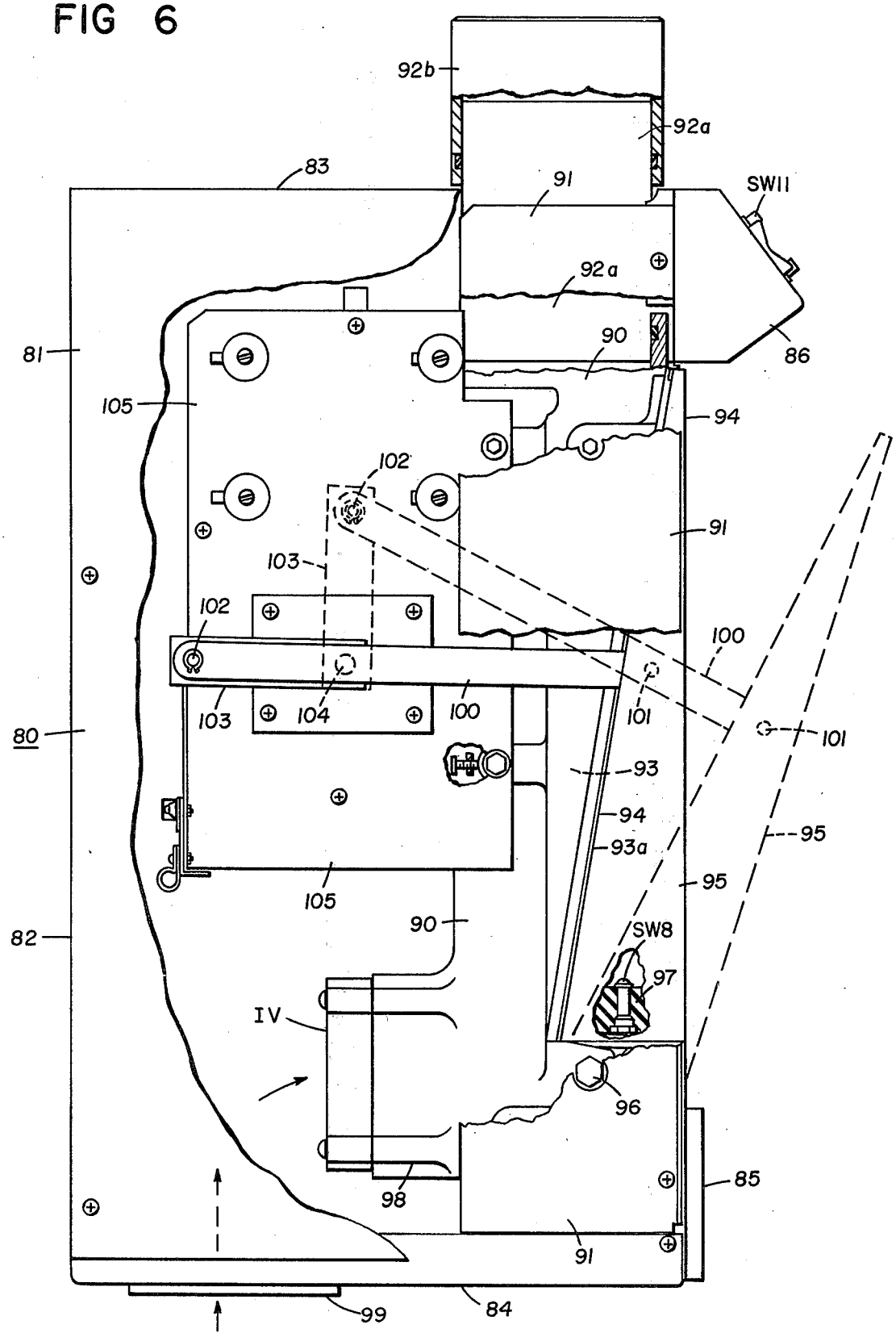
FIG. 6 is a side elevational view of the teller station with the housing side wall broken away.
Figure 7:
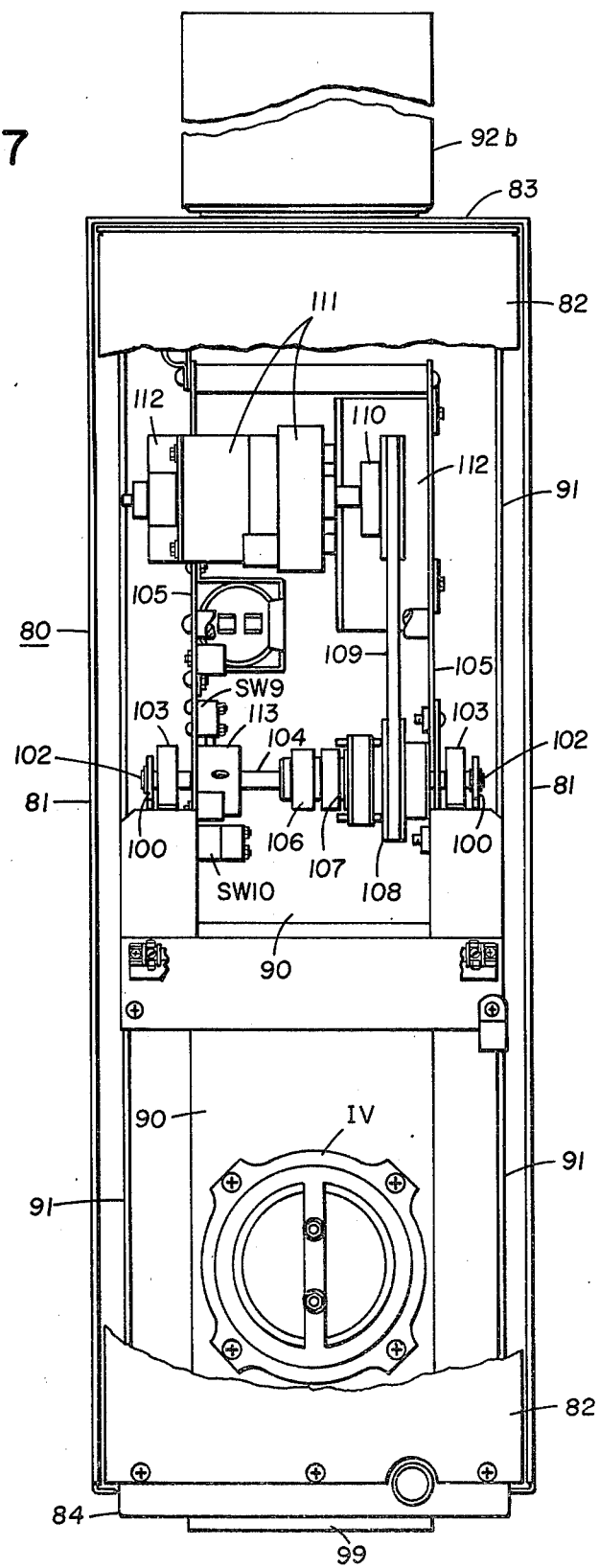
FIG. 7 is a rear elevational view of the teller station with the housing rear wall broken away.

The electrical control circuitry for the two stations CS and TS can be of any conventional nature as will be readily apparent and, since it plays no part in the present invention, need not be described other than functionally. An example of similar circuitry is found in U.S. Pat. No. 3,841,584, for instance. Suffice to say that to place the system in operation the power switch SW14 is thrown to ready the various electrical components, the switch SW14 also opening the door 55 at the customer station CS. The door 55 is under the sole control of the teller who can open it in the morning and close it in the evening or upon each transaction by a customer in the event of rain, for instance. Or, of course, the door 55 could be arranged to open and close automatically upon each transaction. In any event, the door motor 62 is activated, whereupon the pinion 61 and rack 60 cause the door 55 to slide to one side until halted by the limit switch SW4 to expose the sleeve 35 closing the carrier receptacle 34. If a carrier is not already in the latter, whose presence will be shown by the lamp L1, the teller can open his door 95 by the switch SW13 which activates the motor 111 and which through the pulleys 108 and 110 and the belt 109 rotates the shaft 104. The pitman arms 103 thereupon move to push the link arms 100 and the door 95 about its pivot 96 to the position shown in broken lines in FIG. 6, whereupon the cam 113 and the limit switch SW9 shut off the motor 111. When a carrier is placed on the cushion 97, the plunger switch SW8 is depressed, activating the motor 111 in the opposite direction to close the door 95 until halted by the limit switch SW10, whereupon the carrier is fully within the receptacle 93. The switches SW8 and SW10 together then activate the blower 21 at the station CS and the valve 22 to shift the latter from its neutral position to that causing the blower 21 to draw air from the hose 30. The depression thus created in the receiver 31 through the port 29, the tube PT and receiver 90 draws air in through the intake valve IV beneath the carrier on the door 95 and thereby propels it through the tube PT. As the carrier arrives in the receptacle 34, it depresses the lever 49, throwing the switch SW3, and halts against the cushion 28. The switch SW3 also thereupon returns the shift valve 22 to its neutral position and turns off the blower 21. The sleeve motor 40 is likewise activated by the switch SW3 at the same time and through the pulleys 42 and 45 and the belt 47 slides the sleeve 35 to one side to expose the carrier receptacle 34 and the carrier therein, the motor 40 being halted by the limit switch SW1. The depression of switch SW3 also lights the lamp L1 to indicate to the teller the presence of the carrier at the customer station CS.

When the customer removes the carrier, the lever 49 releases the switch SW3 and indicates at L1 that the carrier has been removed and at L2 that the receiver 34 is open. Replacement of the carrier in the receptacle 34 again depresses the lever 49 and switch SW3 and sets the circuit for return of the carrier. Then the customer pushes the carrier send switch SW7, whereupon the sleeve motor 40 is activated to close the receptacle 34 until halted by the limit switch SW2. The latter switch then also turns on the blower 21 and moves the shift valve 22 to its opposite position to supply air under pressure through the hose 30 and port 29 against the carrier, sending the latter from the receiver 31 through the tube PT. The air ahead of the carrier is exhausted through the valve EV, and once past the latter the pressurized air also is exhausted from the tube PT through the valve EV. The carrier continues under its own momentum down into the receiver 90 and receptacle 93 at the teller station, being braked by the dead air in the receiver 90, striking the cushion 97 and depressing the plunger switch SW8. The latter switch then returns the shift valve 22 to neutral, shuts off the blower 21 and opens the door 95 in the manner previously described to present the carrier to the teller. As long as the carrier remains on the door 95 the latter stays open. If, however, the carrier is removed and then replaced on the door 95 within a period of a few seconds, that is to say, if the teller should "fumble" the carrier, a delay circuit prevents the door 95 closing and the sending of the carrier. After that period the circuit is automatically set for return of the carrier, and when the teller has completed his transaction and replaced the carrier on the door 95, the plunger switch SW8 then closes the door 95 and sends the carrier in the manner previously related. Any time a carrier is not being sent through the system the teller can open and close the door 95 with the switch SW12 regardless of the presence of the carrier on the door 95. Should the teller make an error, for example, sending the wrong carrier or some other error, he can recall the carrier, whether in the tube PT or the receptacle 34, by pressing the carrier recall switch SW11 which will appropriately reverse or activate, as the case may be, the blower 21 and shift valve 22. In short, the teller can override the logic and control at the customer station CS at any time. If a customer should need help, he can push the call switch SW6 and converse with the teller over the microphone 67 and the speaker 68.

Essentially, therefore, especially when compared with other apparatus for the same purpose, the present invention provides a single pneumatic tube system and customer station which is markedly simpler and thus lower in cost and upkeep. The movements required by a customer at the customer station are natural ones; he simply reaches down and into the receptacle 34, whether returning or removing the carrier, so that the latter can always remain in a natural and comfortable horizontal position. Preferably, the exhaust valve EV, and the intake valve IV through the adapter 99, are ducted to the out-of-doors, rather than the interior of the teller's station, so that on cold days especially, no warm air is passed through the tube PT to cause condensation therein under those conditions. The latter arrangement also prevents cold air and auto exhaust fumes from being dumped into the enclosed teller station. In any event, though the present invention has been described in terms of a particular embodiment, being the best mode known of carrying out the invention, it is not limited to the embodiment alone. Instead the following claims are to be read as encompassing all adaptations and modifications of the invention falling within its spirit and scope.

I claim:

1. In a pneumatic tube system for drive-up banking and the like, the system including a tube interconnecting bank teller and customer stations for pneumatically transporting a generally cylindrical carrier through the tube in either direction between the two stations, the customer station including blower means, the improvement wherein the customer station comprises: a generally tubular customer carrier receiver assembly having opposite ends and disposed in a generally horizontal position, a first one of said ends being connected to one end of the tube in order to receive a carrier from and to send a carrier through the tube, the second of said ends forming a carrier stop and connected to the blower means, the blower means being effective to alternately supply air to or exhaust air from the customer receiver assembly; the receiver assembly adjacent said second end having a stationary portion and a portion carried by and horizontally slidable on the stationary portion in opposite axial directions with respect to the stationary portion between open and closed positions, one of said portions carrying said second receiver assembly end and providing a customer carrier receptacle permitting a carrier to be inserted in and removed from the customer receiver assembly when said movable portion is in its open position, the other of said portions providing a customer carrier receptacle closure when said movable portion is in its closed position effective to close the customer receiver assembly so that the blower means can move a carrier through the tube from one of the customer and teller stations to the other; and customer receptacle closure operating means having a first stage responsive to the arrival of a carrier in the customer receptacle to automatically move said movable portion to its open position for removal of the carrier.

2. The system of claim 1 including first blower operating means disposed at the customer station, and wherein said first stage also automatically activates said blower operating means to deactivate the blower means.

3. The system of claim 2 wherein the customer receptacle closure operating means is provided with second and third stages, said second stage automatically activating the customer receptacle closure operating means to move the customer receptacle closure to its closed position responsive to replacement of a carrier in the customer receptacle after its removal therefrom, said third stage being effective upon initiation after closure of the customer receptacle closure as aforesaid to activate said blower operating means to cause the blower means to supply air for sending of a carrier from the customer receiver assembly through the tube to the teller station.

4. The system of claim 3 wherein said third customer stage is initiated by manual control means disposed at the customer station.

5. The system of claim 1 wherein said second receiver assembly end is carried by said stationary portion, the stationary portion being longitudinally apertured to provide the customer carrier receptacle; and wherein said movable portion constitutes the customer carrier receptacle closure.

6. The system of claim 5 wherein the customer receptacle closure comprises a sleeve enveloping said stationary portion of the customer receiver assembly and axially slidable thereon to open and close the customer receptacle.

7. The system of claim 6 including a customer station housing having adjacent front and top wall portions, the customer receiver assembly being disposed behind and generally parallel thereto, said wall portions being conjointly apertured to provide a receptacle access opening in both of said portions in registry with the customer carrier receptacle therebehind; and a closure for the receptacle access opening, said closure being laterally slidable to open and close the receptacle access opening; and power operating means for said closure including control means therefor disposed at the teller station.

8. The system of claim 1 wherein the teller station includes a generally tubular teller carrier receiver assembly connected at one end to the other end of the tube, said receiver assembly having a carrier stop intermediate its said end and an air inlet only valve disposed adjacent the other end of said receiver, the teller carrier receiver assembly communicating with the atmosphere through said stop and valve.

9. The system of claim 8 wherein the teller receiver assembly includes a teller carrier receptacle permitting a carrier to be inserted into and removed from the teller receiver assembly; a teller carrier receptacle closure carried by the teller receiver assembly to open and close the teller receptacle; and teller receptacle closure operating means having a first stage responsive to the arrival of a carrier at the teller receptacle to automatically move the teller receptacle closure to its open position for removal of the carrier and a second stage responsive to placement of a carrier in the teller receptacle after its removal therefrom to automatically move the teller receptacle closure to its closed position.

10. The system of claim 9 including manual means disposed at the teller station for activating the teller receptacle closure operating means to open and close the teller receptacle closure independently of said first and second teller stages.

11. The system of claim 9 including second blower operating means disposed at the teller station, and wherein said first teller stage also activates the second blower operating means to deactivate the blower means.

12. The system of claim 11 wherein said second teller stage upon closure of the teller receptacle closure thereafter automatically activates the second blower operating means to cause the blower means to exhaust air from the customer receiver assembly for sending of a carrier from the teller receiver assembly through the tube to the customer station.

13. The system of claim 11 including third blower operating means effective to cause the blower means to supply air to the customer receiver assembly for sending of a carrier from the customer station through the tube to the teller station independently of the first blower operating means, the third blower operating means having manual control means therefor disposed at the teller station.

* * * * *